April 15, 1969   J. G. HUMPHRESS ET AL   3,438,115
METHOD OF MAKING VACUUM CONTAINERS
Filed Nov. 30, 1967

INVENTORS.
JOSEPH G. HUMPHRESS
ROBERT L. ZEUNIK
BY Barnwell P. King
ATTORNEY

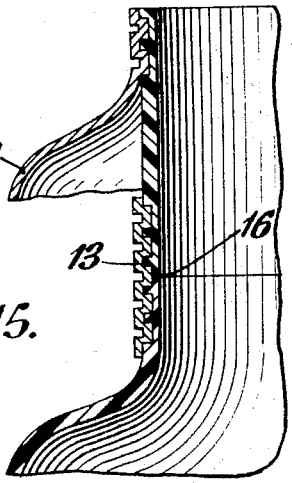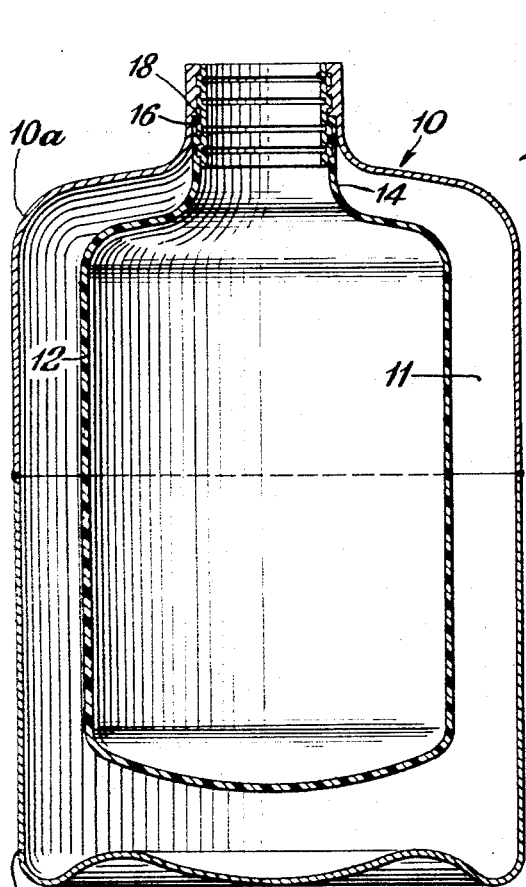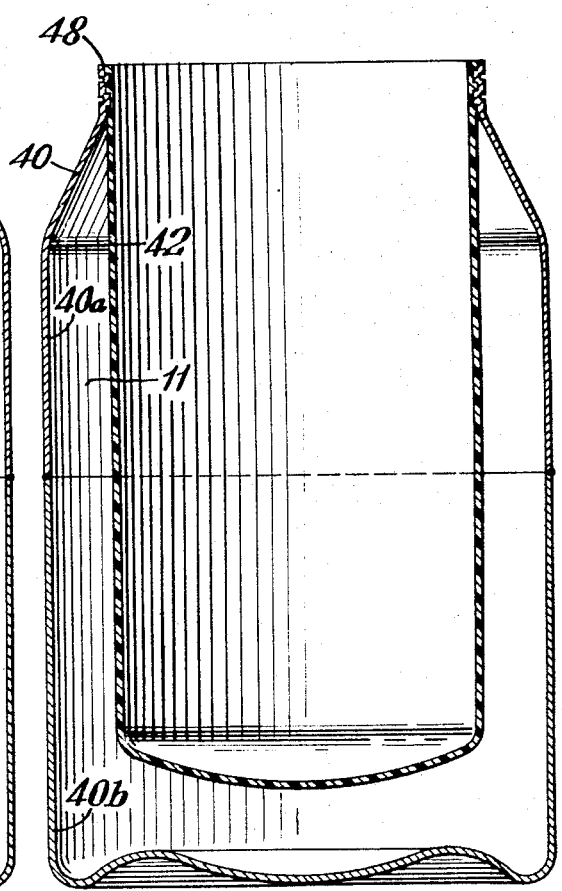

United States Patent Office 3,438,115
Patented Apr. 15, 1969

3,438,115
METHOD OF MAKING VACUUM CONTAINERS
Joseph G. Humphress, Youngstown, N.Y., and Robert L. Zeunik, Indianapolis, Ind., assignors to Union Carbide Corporation, a corporation of New York
Continuation-in-part of application Ser. No. 410,088, Nov. 10, 1964. This application Nov. 30, 1967, Ser. No. 690,046
Int. Cl. B65d 25/14; B23p 11/00; B21d 39/04
U.S. Cl. 29—421
5 Claims

ABSTRACT OF THE DISCLOSURE

A method of making a double-walled container having a neck tube joining inner and outer shells, defining an evacuable space between the shells, wherein the joints between the neck tube ends and the shells are made by magnetically deforming flanges on the shells into annular grooves formed into the neck tube.

---

This application is a continuation-in-part of application Ser. No. 410,088, filed Nov. 10, 1964, now abandoned.

This invention relates to vacuum containers, and, more particularly, to a method of making a vacuum container wherein the joint between the inner and outer shells can be rapidly formed without welding to provide a vacuum-safe junction.

The invention provides a novel method of making vacuum containers, particularly those having a neck tube joining inner and outer shells of a vacuum insulated space, which comprises placing one of the ends of the neck tube in overlapping position with either the inner or outer shell of the container, and then inducing a magnetic field across the overlapped portion so as to form a vacuum safe mechanical joint between the neck tube and the shell.

The use of double-walled vacuum insulated containers for the storage and handling of liquefied gases is well known in the field of cryogenics. Usually, in such containers the container's inner and outer shells or walls are joined by a neck tube so as to provide access to the container's inner storage vessel. Since this neck tube provides a direct heat leak path to the storage container's inner vessel, it must be of necessity fabricated from a low heat conductive material. For example, the use of Hastelloy as the neck tube material is common in the industry. More recently, as described in co-pending application Ser. No. 337,696, now abandoned, a plastic material has been used.

Regardless of which type of material is being used as the neck tube, there is always the problem of forming a leak tight joint between the neck tube and the container's inner and outer shells. Such joints are highly critical in order to maintain the high vacuum required between the inner and outer shells.

Because of the serious effect of heat leakage, it is also advantageous to form the inner shell of the container from a low conductive plastic, with only the outer shell made of metal to provide the necessary ruggedness. It can be appreciated that a container having the inner shell and neck tube formed of a low conductive plastic would provide a significant reduction in heat leak in comparison with the same container if formed with a metal inner shell. Until the present invention, however, it has been exceedingly difficult to commercially produce vacuum safe joints between the plastic inner and metal outer shells of containers formed without a neck tube as well as between the plastic neck tube and plastic inner and metal outer shells of containers formed with a neck tube.

It is the principal object of the present invention to provide an improved method for making a double walled vacuum insulated container having a better vacuum safe joint between the neck tube and inner and outer shells than has been possible in the past.

Another object is to provide an improved method for making a double walled vacuum insulated container having an inner plastic shell with a plastic neck tube and wherein excellent vacuum safe joints are produced.

Still another object is to provide an improved method of making a double walled vacuum insulated container having an inner plastic shell, such container being formed without a neck tube.

According to one embodiment of the invention a method for making a vacuum insulated container having inner and outer shells joined by a neck tube and spaced from each other to define an evacuable space, is provided. The method comprises providing inner and outer metal shells having annular flanges which can be fitted in overlapping relation with a portion of the neck tube. The outer shell is provided in separate upper and lower sections. The annular flange of each of the shells is placed in overlapping relation with opposite ends of the neck tube and a magnetic field is then induced across each of the overlapped portions so as to deform at least one member of each overlapped portion against the other member of each overlapped portion to form vacuum tight seals between the neck tube and inner and outer shells. Thereafter, the lower section of the outer shell is placed around the inner shell and joined, for example, by welding, to the outer shell upper section. In order to produce a vacuum safe joint the neck tube has at least one annular recess adjacent its ends and each of the shell outer flanges upon deformation has an annular integral corrugation which mates with the neck tube recess.

According to another embodiment of the invention the inner shell is formed of low conductive plastic and preferably has an integral plastic neck tube, thereby eliminating the need for making a joint between the neck tube and inner shell. The upper end of this neck tube is then joined to the metal outer shell upper section by magnetically deforming the metal upper section annular flange against the plastic neck tube and the lower section of the outer shell is joined to the upper section in the same manner mentioned above.

Preferably an adhesive is applied between the overlapped portions prior to inducing the magnetic field in order to further ensure the formation of a vacuum safe joint. It is also preferably, particularly when using plastic or thin metal neck tubes to insert a mandrel into the neck tube to support same against collapse from the deforming forces set up by the magnetic field.

According to yet another embodiment of the invention, whenever it is desired to form a container having a plastic inner shell and a neck tube of either a plastic or poor heat conductive metal, e.g. stainless steel, before inducing the magnetic field, an annular metal transistion ring is placed in overlapping relation with the portions to be joined. Thereafter, a magnetic field is induced across the transition ring causing it to deform against each of the portions to be joined and thereby effect a vacuum safe seal therebetween.

The invention is more fully described below with reference to the accompanying drawings, in which:

FIGS. 14 and 15 are enlarged fragmentary sections of two additional modifications of the invention after formation of the joint in each case;

FIG. 16 is a cross sectional view in elevation of the container partially shown in FIG. 1, and FIG. 17 is a cross sectional view in elevation of a container formed without a neck tube according to another embodiment of the invention.

Briefly, according to the invention, the joints between a neck tube and the inner and outer shells are formed by passing a magnetic field across at least one of the overlapped sections of the neck tube and shells so as to form a leak tight mechanical joint. The device used to perform the process preferably is the electromagnetic metal forming machine described in U.S. Patent No. 2,976,907, issued Mar. 28, 1961, to G. W. Harvey et al.

As described in such patent, the forming apparatus includes means for setting up a predetermined, adjustable magnetic field, and means for maintaining the metal to be formed within the magnetic field for a length of time such that sufficient energy is acquired by the metal to form the metal in the desired manner. The device operates on the principle that when a current carrying conductor is placed across a magnetic field, the conductor will be subjected to a pressure which will tend to move the conductor. The amount of pressure on the conductor is proportional to the product of the current through the conductor and the component of the magnetic field perpendicular to the current. Thus, if the current carrying conductor is held stationary in the magnetic field, the pressure acting on the conductor, if high enough, will cause the conductor to become deformed.

Figure 1:
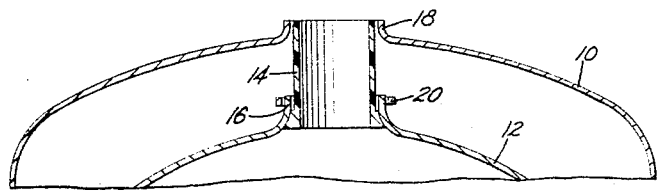
FIG. 1 is a fragmentary cross section of the upper portion of a double-walled container of the invention, showing the neck tube in relation to the inner and outer shells prior to formation of the joint.

Referring now to FIGS. 1 and 16, the upper portion of a typical container utilizing a neck tube and formed by one embodiment of the present invention, comprises outer and inner shells 10 and 12 connected by a neck tube 14 so as to be able to form an evacuable space 11 between the shells. As shown, the leak tight connection has not as yet been made between the neck tube and the shells.

According to one embodiment, the shells 10 and 12 are made of a metal such as aluminum and the neck tube 14 is made of a low conductive material such as Hastelloy or a thermosetting plastic material. In any case, the outer shell is provided in separate upper and lower sections 10a and 10b respectively. The inner shell 12 has an annular flange 16, and outer shell upper section 10a has an annular flange 18.

Figure 13:
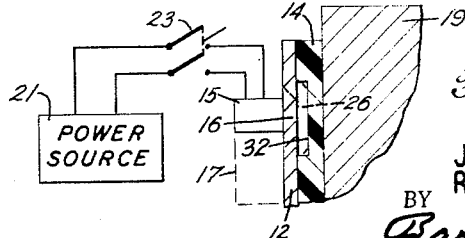
FIG. 13 is a circuit diagram of the apparatus.

Assuming the shells to be made of aluminum, and the neck tube to be made of either Hastelloy or plastic, the procedure for forming the joints is as follows: The inner shell, FIG. 13, is positioned such that flange 16 telescopically overlaps one end of the neck tube 14. This assembly is then positioned within the solenoid or coil 15 of the previously described metal forming device of U.S. 2,976,907 with the aid of a suitable holding fixture 17. A mandrel 19 is preferably placed inside the neck tube 14 as a backup, such that there can be no relative movement of the assembly, and thereby also prevent collapse of the neck tube by the deforming forces set up. Electrical current is then supplied to the coil 15 from a power source 21 by closing switch 23, and the aluminum flange 16 being a conductor will deform so as to form an annular corrugation 26 the inner surface of which mates with an annular recess 32 on the tube 14, completing a mechanical joint with the neck tube. This process is then repeated with the outer shell 10 and its flanged portion 18.

To further assure the making of a vacuum safe seal, it is preferable to apply a minor amount of adhesion between the overlapped portions prior to inducing the magnetic field. A suitable epoxy type adhesive such as Armstrong A–12 or Narmco brand has been found acceptable for this purpose.

After the joints have been formed, the inner shell is preferably insulated by wrapping same with the multi-layered composite insulation described in U.S. Patent 3,007,596. Alternatively, the entire container may be assembled and thereafter a powdered insulating material may be blown into the space between the inner shell 12 and outer shell 10.

As a final step in the assembly of the container, the lower section 10b is placed around the inner shell 12 and joined to the outer shell upper section 10a, as for example, by weld 11.

If the shells were made of stainless steel and the neck tube either Hastelloy or plastic material, then the necessary electrical conductor is not part of the assembly. Under this condition, the electrical conductor can be integrated into the system through a driving band 20. The band can be made of any good electrical conductor such as aluminum or copper. The band would thus deform so as to drive the flange 12 against the neck tube.

Figure 2:
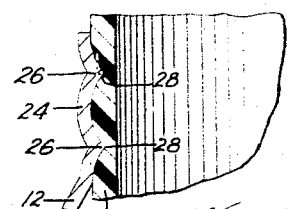
FIGS. 2 through 12 are enlarged fragmentary sections of several modifications of the invention after formation of the joint in each case.
Figure 3:
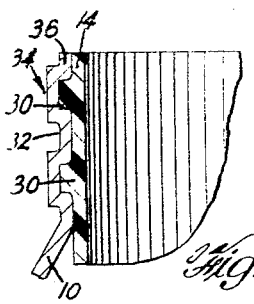
Figure 4:
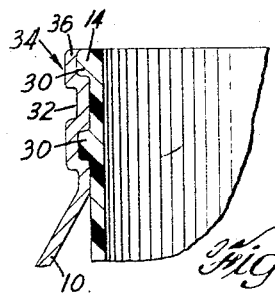
Figure 5:
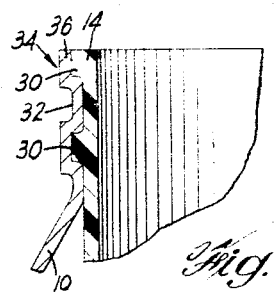
Figure 6:
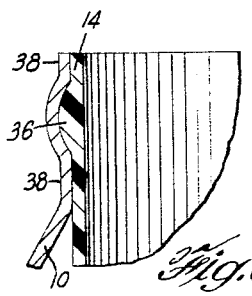
Figure 7:
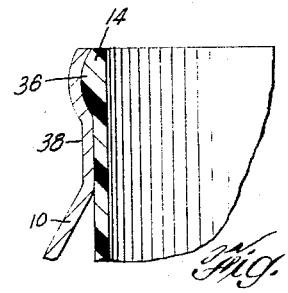
Figure 8:
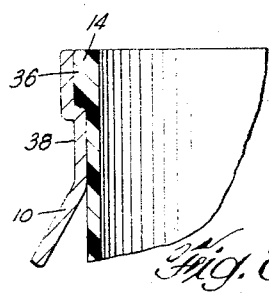
Figure 9:
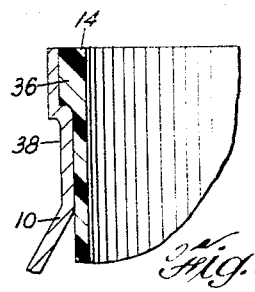
Figure 10:
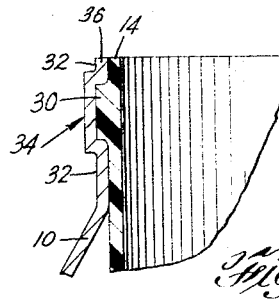
Figure 11:
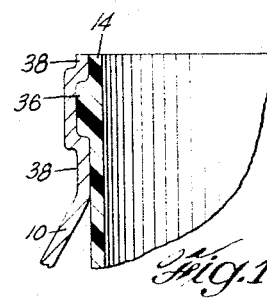

FIGS. 2 through 12 show various neck tube configurations from which joints have been formed according to the invention. The parameters of the joint design are strength, vacuum safe sealing, heat transfer (heat leak), reliability and cost. The joints of FIGS. 2 and 5 are preferred.

As shown in FIG. 2, the vacuum container 22 comprises spaced shells, at least one of which is composed of metal having an upper end portion 24 that is deformed inwardly to provide corrugation 26 mating with annular recesses 28 to provide a leak tight joint. The neck tube in this case is composed of a suitable plastic-like material.

In FIGS. 3, 4, 5 and 10 the neck tube has spaced annular ribs 30 between which annular recess 32 is located to receive the inwardly deformed material constituting corrugation 34 of the flange 36 of the metal shell 10.

Figure 12:
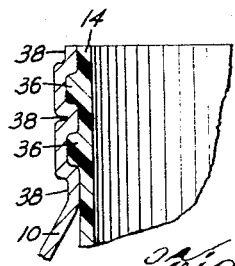

In FIGS. 6–10, only one annular rib 36 is provided near or at the top of the tube 14, leaving annular recesses 38 both above and below the rib, or only either above or only below such rib; or both ribs, as shown in FIG. 12.

Referring to FIG. 14, an embodiment of the invention is shown wherein the inner shell 12 is formed of a low conductive plastic and has a plastic neck tube formed as an integral part thereof. This construction offers low heat leakage and eliminates the need for the joint between the inner shell and neck tube. The inner shell is preferably insulated with the above mentioned insulation of U.S. Patent 3,007,596 prior to forming the joint with the outer shell upper section 10a as above-described. Thereafter the lower section is placed around the inner shell and joined to the upper section 10a as previously described.

FIGURE 15 illustrates a method of forming a joint between a plastic inner shell and a plastic neck tube and consists in placing the annular flange 16 of the inner shell in aligned adjacency with the end of the neck tube, preferably such that they abut one another, and thereafter placing an annular metal transition ring 13 in overlapping contact with each of the aligned parts. Thereafter, a magnetic field is induced across the transition ring 13 in order to deform same against each of the aligned parts to form a vacuum-tight joint. The transition ring is preferably formed of aluminum. An adhesive is preferably applied to the parts to be joined, and a mandrel is preferably inserted into the neck tube prior to the deforming step as previously described.

FIGURE 17 illustrates another embodiment of the invention for making a double walled container which does not require a neck tube. The method consists of providing an inner shell 42 having vertical walls formed of a non-metallic low conductive material such as a plastic, and an outer shell 40 having separate upper and lower sections 40a and 40b respectively. The upper section 40a has an annular flange 48 which preferably is sized with respect to the diameter of inner shell 42 so as to form an overlapping contact with the upper portion of the vertical wall thereof. If multilayered, insulation is to be applied to the inner shell, it preferably should be done before assembling the inner shell within the outer shell upper section. Thereafter a magnetic field is set up across the metal outer shell upper section 40a as previously described to deform same into the annular grooves in the top of the vertical wall of the inner shell 42 so as to form the vacuum tight seal joint. Thereafter the outer shell lower section 42b is joined to the outer shell upper section 42a in the previously described manner.

Alternatively, if desired, the joints of the FIGURE 17 container could be formed by placing the upper portion of the vertical wall of the inner shell in aligned adjacency with the top of the outer shell upper section and the two joined by deforming a bridging metal transition ring as previously described in connection with FIGURE 15.

Still further, while it is desirable to form the inner shell of a low conductive plastic material, the FIGURE 17 embodiment can be formed in the same manner using a metal inner shell.

What is claimed is:

1. Method for making a vacuum insulated container having inner and outer shells joined by a neck tube and spaced from each other to define an evacuable space which comprises:
   (a) providing inner and outer metal shells having annular flanges which can be fitted in overlapping relation with a portion of said neck tube, said outer shell being provided in separate upper and lower sections;
   (b) placing the annular flange on one of said shells in overlapping relation with one end of said neck tube;
   (c) inducing a magnetic field across the overlapped portions of said annular flange of said one shell and said one end of said neck tube so as to deform at least one of said portions against the other portion and establish a vacuum tight seal therebetween;
   (d) placing the annular flange on the other of said shells in overlapping relation with the opposite end of said neck tube;
   (e) inducing a magnetic field across the overlapped portions of said annular flange of said other shell and said opposite end of said neck tube so as to deform at least one of said portions against the other portion and establish a vacuum tight seal therebetween; and
   (f) placing the lower section of said outer shell around said inner shell and adjoining same to said outer shell upper section.

2. Method for making a vacuum insulated container having inner and outer shells joined by a neck tube and spaced from each other to define an evacuable space which comprises:
   (a) providing a nonmetallic low conductive inner shell having an integral neck tube extending therefrom and an outer metal shell having an annular flange and being separated into upper and lower sections;
   (b) placing the inner shell within the upper section of the outer shell with its neck tube in overlapping relation with the annular flange thereof;
   (c) inducing a magnetic field across the overlapped portions of said neck tube and annular flange so as to deform said annular flange against said neck tube and thereby establish a vacuum-tight seal therebetween, and
   (d) placing the lower section of said outer shell around said inner shell and joining same to said outer shell upper section.

3. The method of claim 2 wherein a mandrel is inserted into said neck tube prior to the inducing of the magnetic field in order to support the neck tube against collapse.

4. Method as defined by claim 2 in which an adhesive is applied between the overlapped portions prior to inducing the magnetic field.

5. Method of making double-walled vacuum containers having inner and outer metal shells connected by a neck tube, which comprises providing such shells with annular flanges which can be fitted around the tube, said outer shell being provided in separate upper and lower sections; arranging said annular flange on the inner one of such shells and the tube in overlapping relation, inserting a mandrel inside of such tube opposite the annular flange on said shell, deforming such flange inwardly against such tube by inducing an electric current in a conductor surrounding the flange which forces such flange toward the tube, forming a vacuum tight seal, removing the mandrel, placing said outer shell upper portion with its annular flange in overlapping relation with the opposite end of said tube and similarly forming a vacuum tight seal between the flange of the outer shell and such tube and placing the lower section of said outer shell around said inner shell and joining same to said outer shell upper section.

References Cited

UNITED STATES PATENTS

| 2,976,907 | 3/1961 | Harvey et al. | |
| 3,068,563 | 12/1962 | Reverman | 29—458 |
| 3,101,862 | 8/1963 | Matsch | 220—14 |
| 3,214,511 | 10/1965 | Franklin. | |
| 3,303,560 | 2/1967 | Lansky et al. | |

OTHER REFERENCES

"Metalworking Production" May 6, 1964 (p. 79 relied on) (copy in Group 320, Class 29, Subclass 421M).

CHARLIE T. MOON, *Primary Examiner.*

U.S. Cl. X.R.

29—516, 455; 220—14